(12) United States Patent
Sale et al.

(10) Patent No.: US 11,329,307 B2
(45) Date of Patent: May 10, 2022

(54) APPARATUS FOR MANUFACTURING ELECTRICAL ENERGY STORAGE DEVICES

(71) Applicant: MANZ ITALY S.R.L., Sasso Marconi (IT)

(72) Inventors: Massimiliano Sale, Sasso Marconi (IT); Stefano Saguatti, Modena (IT)

(73) Assignee: MANZ ITALY S.R.L., Sasso Marconi (IT)

( * ) Notice: Subject to any disclaimer, the term of this patent is extended or adjusted under 35 U.S.C. 154(b) by 355 days.

(21) Appl. No.: 16/628,390

(22) PCT Filed: Jun. 28, 2018

(86) PCT No.: PCT/IB2018/054796
§ 371 (c)(1),
(2) Date: Jan. 3, 2020

(87) PCT Pub. No.: WO2019/008478
PCT Pub. Date: Jan. 10, 2019

(65) Prior Publication Data
US 2020/0220198 A1    Jul. 9, 2020

(30) Foreign Application Priority Data
Jul. 4, 2017   (IT) .......................... 102017000075065

(51) Int. Cl.
*H01M 10/04*    (2006.01)
*H01G 11/86*    (2013.01)
*H01G 13/00*    (2013.01)
*H01G 13/02*    (2006.01)
*H01M 10/052*   (2010.01)

(52) U.S. Cl.
CPC ........ *H01M 10/0409* (2013.01); *H01G 11/86* (2013.01); *H01G 13/006* (2013.01); *H01G 13/02* (2013.01); *H01M 10/052* (2013.01)

(58) Field of Classification Search
CPC ............ H01M 10/0409; H01M 10/052; H01G 11/86; H01G 13/006; H01G 13/02
See application file for complete search history.

(56) References Cited

U.S. PATENT DOCUMENTS

2009/0239133 A1   9/2009  Kosugi
2012/0222819 A1   9/2012  Watanabe
2014/0174268 A1   6/2014  Sale

FOREIGN PATENT DOCUMENTS

DE    10 2013 203810    9/2014
JP       2000 348757   12/2000
WO    WO 2017/072898    5/2017

*Primary Examiner* — Sarah A. Slifka
(74) *Attorney, Agent, or Firm* — Leason Ellis LLP

(57) ABSTRACT

An apparatus for manufacturing electrical energy storage devices, comprising a path for feeding material with intermittent feed and two machining stations arranged one after the other in the feed path, in which each machining station is movable on a linear guide at the command of a motor to vary its position along the feed path and enable the mutual distance between the two machining stations to be adjusted in function of the step of intermittent feed of the material, so that the apparatus is adaptable to the change in product size.

11 Claims, 4 Drawing Sheets

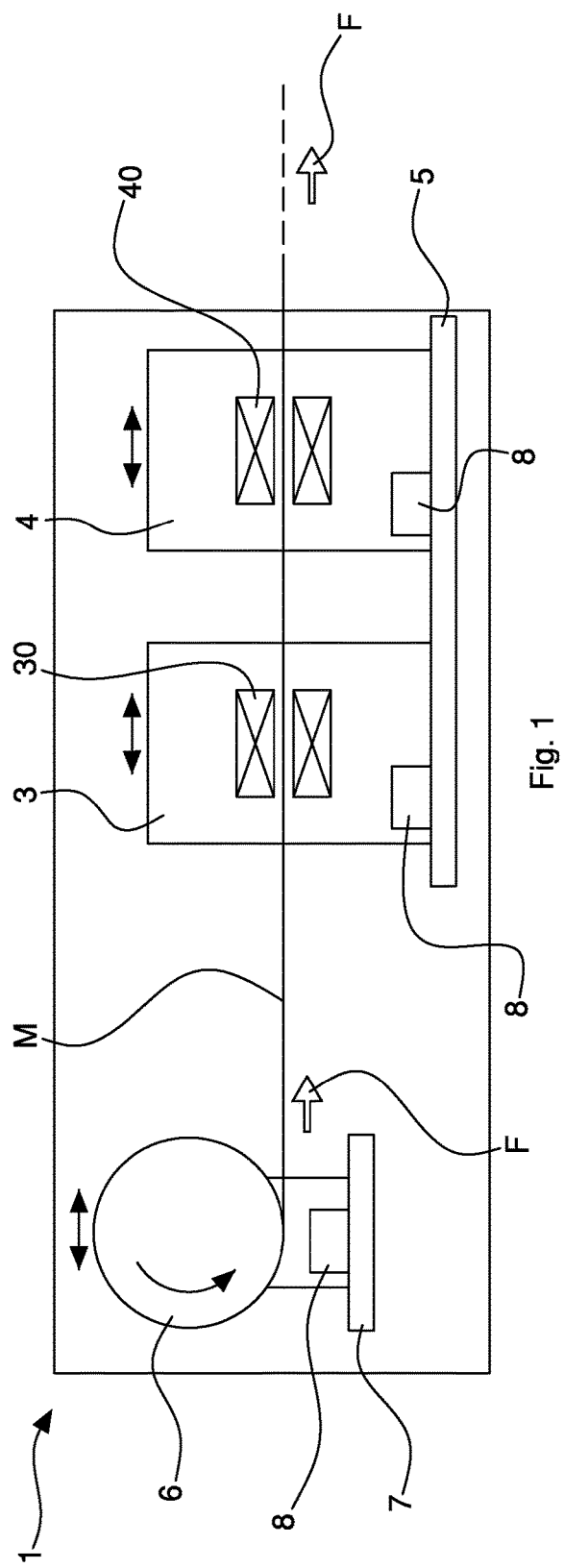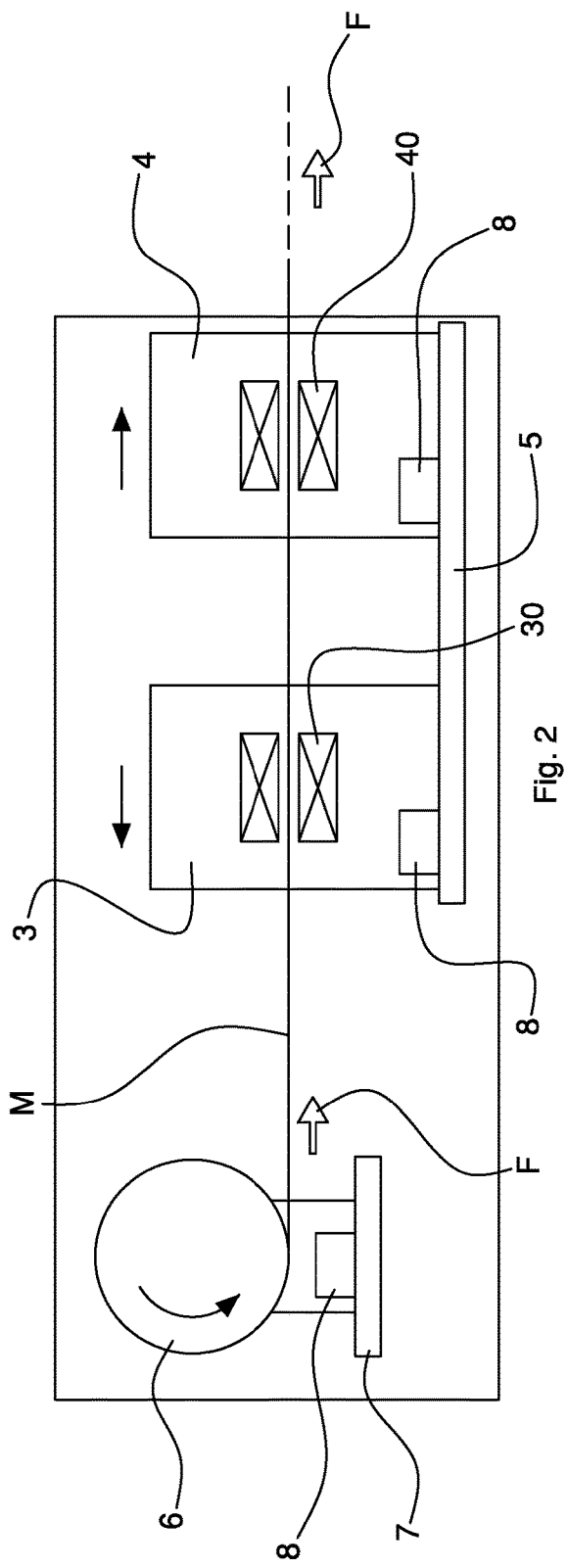

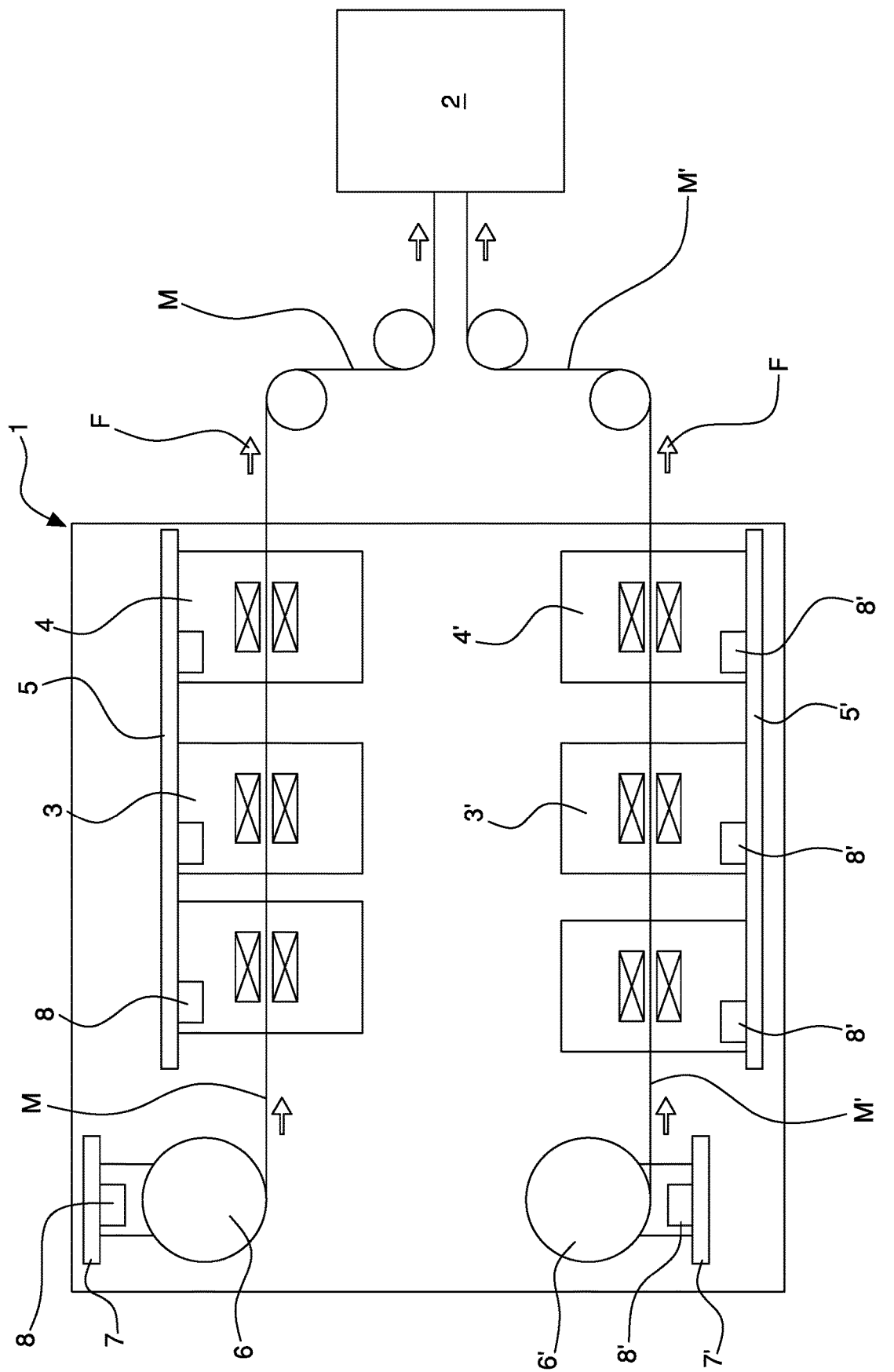

APPARATUS FOR MANUFACTURING ELECTRICAL ENERGY STORAGE DEVICES

CROSS-REFERENCE TO RELATED PATENT APPLICATIONS

This application is a U.S. National Phase application under 35 U.S.C. § 371 of International Patent Application No. PCT/IB2018/054796, filed on Jun. 28, 2018, which claims priority from Italian Patent Application No. 102017000075065, filed on Jul. 4, 2017, all of which are incorporated by reference as if expressly set forth in their respective entireties herein.

BACKGROUND OF THE INVENTION

The invention relates to a machining apparatus, in particular for machining continuous material (in the form of a web, strip, sheet, etc).

Specifically, but not exclusively, the invention can be applied to manufacturing electrical energy storage devices, it being provided, in particular, that the material machined with the apparatus in question is wound or stacked to make an electrical energy storage device. In particular, the invention may be applied in apparatuses for winding and/or stacking in production electrical energy storage cells, such as for example lithium batteries and capacitors.

The prior art comprises an apparatus for manufacturing electrical energy storage devices in which at least two machining stations are arranged one after another along a path for advancing the material to be machined (for example an electrode). The machining stations are fixed in a cantilevered manner on a plate extending vertically that defines a reference machining plane.

One of the problems of the prior art is to adapt the apparatus to a change in product size, as in general the size change (in particular the length dimension of the electrodes) can cause a variation of the machining step and thus of the step of intermittent feed of the material, with the consequent need to compensate in some way for this variation so that, during each stop of the material, the machine can be performed substantially simultaneously in all the machining stations.

In order to overcome this problem, using a feed path provided with one or more path portions of variable length is known, in which the material is slidable on movable pulleys the movement of which enables the length of the path portion to be modified that is comprised between the machining stations, in order that this length is always a multiple of the step of intermittent feed of the material.

The document US 2009/239133 discloses an apparatus and a method for manufacturing a rolled electrode battery comprising a rolled electrode body including a band-shaped positive electrode plate and a band-shaped negative electrode plate formed individually with electrode active material layers, which are rolled with a band-shaped separator interposed between the positive and negative electrode plates and formed into a flat shape; and a case which contains the electrode body and an electrolyte solution therein and on which a positive electrode terminal and a negative electrode terminal are provided.

The document US 2012/222819 discloses a pitch feed mechanism, which is capable of performing an accurate, high-speed pitch, feed of an original fabric having unevenness on a surface thereof in a sticking operation of an insulating tape. The original fabric pitch feed mechanism that is provided on a downstream side of an insulating tape sticking process region in a long original fabric, and performs the pitch feeding of the original fabric in one direction in accordance with a boundary part.

The document US 2014/174268 discloses a cutting apparatus, wherein a continuous element with a row of electrochemical cells for lithium batteries is supplied along a supply path on which there are sequentially arranged, a cutting device and two dragging devices, each having a shuttle element that has an operating unit associated with the continuous element.

This known solution nevertheless has certain limits and drawbacks. Firstly, there is the need to set up a relatively long path of material and, in general, a large longitudinal dimension of the apparatus. Secondly, the arrangement of path portions of variable length involves various variations in the advancing direction of the material, increasing the risk of great tension and veering of the material, moreover, the great length of the path of the material entails an increase in the mass of the moving material, so in general material cannot be used that is too fragile and/or thin. Further, the apparatus of known type has a certain constructional complication that is due, in particular, to the complexity of the feed path and of the corresponding adjusting system, with a resulting increased risk of machining imprecision and defects in the finished product (electrical energy storage device).

SUMMARY OF THE INVENTION

One object of the invention is to provide an apparatus for machining material fed with intermittent feed, provided with two or more machining stations, in particular for manufacturing electrical energy storage devices, that is easily adaptable to the change in product size.

One advantage is to permit a relatively reduced distance between consecutive machining stations, so that the overall length will be reduced of the path portion of the material that traverses the machining stations.

One advantage is to provide a machining apparatus, in particular for manufacturing electrical energy storage devices, which is adaptable to a variation of the machining step and thus of the step of advancing the material.

One advantage is to obtain a product at the outlet of the machining apparatus that has already been correctly positioned to be received in a continuous line from another machining system arranged downstream of the apparatus.

One advantage is to improve the flexibility and versatility of a machining apparatus with two or more machining stations in line that machine material fed intermittently, in particular for manufacturing electrical energy storage devices.

One advantage is to make available a machining apparatus provided with a relatively reduced longitudinal dimension.

One advantage is to make a machining apparatus and/or method for machining continuous material with high productivity.

One advantage is to make a machining apparatus that is constructionally simple and of practical and immediate use.

One advantage is to reduce the risk of great tension and veering of the material to be machined and to enable relatively fragile and/or thin material to be used.

One advantage is to enable electrical energy storage devices to be manufactured that are of high quality and precision and with high productivity.

Such objects and advantages and still others are achieved by a machining apparatus and/or by a method according to one or more of the claims set out below.

In one embodiment, a machining apparatus, in particular for manufacturing electrical energy storage devices, comprises a path for feeding material with intermittent feed and at least two machining stations arranged one after the other along the feed path, in which at least one machining station is movable on guide means at the command of motor means to vary its position along the feed path and enable the reciprocal distance between the two machining stations to be adjusted in function of the step of intermittent feed of the material, in particular to facilitate the adaptation of the apparatus in the event of a change to the size of the machined product and/or to minimize the length of the material being machined comprised between two or more machining stations.

BRIEF DESCRIPTION OF THE DRAWINGS

The invention can be better understood and implemented with reference to the attached drawings that illustrate some embodiments thereof by way of non-limiting example, in which:

FIG. 1 is a diagram, in a vertical elevation, of a first embodiment of a machining apparatus made according to the present invention;

FIG. 2 is the diagram of FIG. 1 with the machining apparatus in a different operating configuration;

FIG. 5 is a diagram, in a vertical elevation, of a third embodiment of a machining apparatus made according to the present invention.

DETAILED DESCRIPTION

Figure 3:
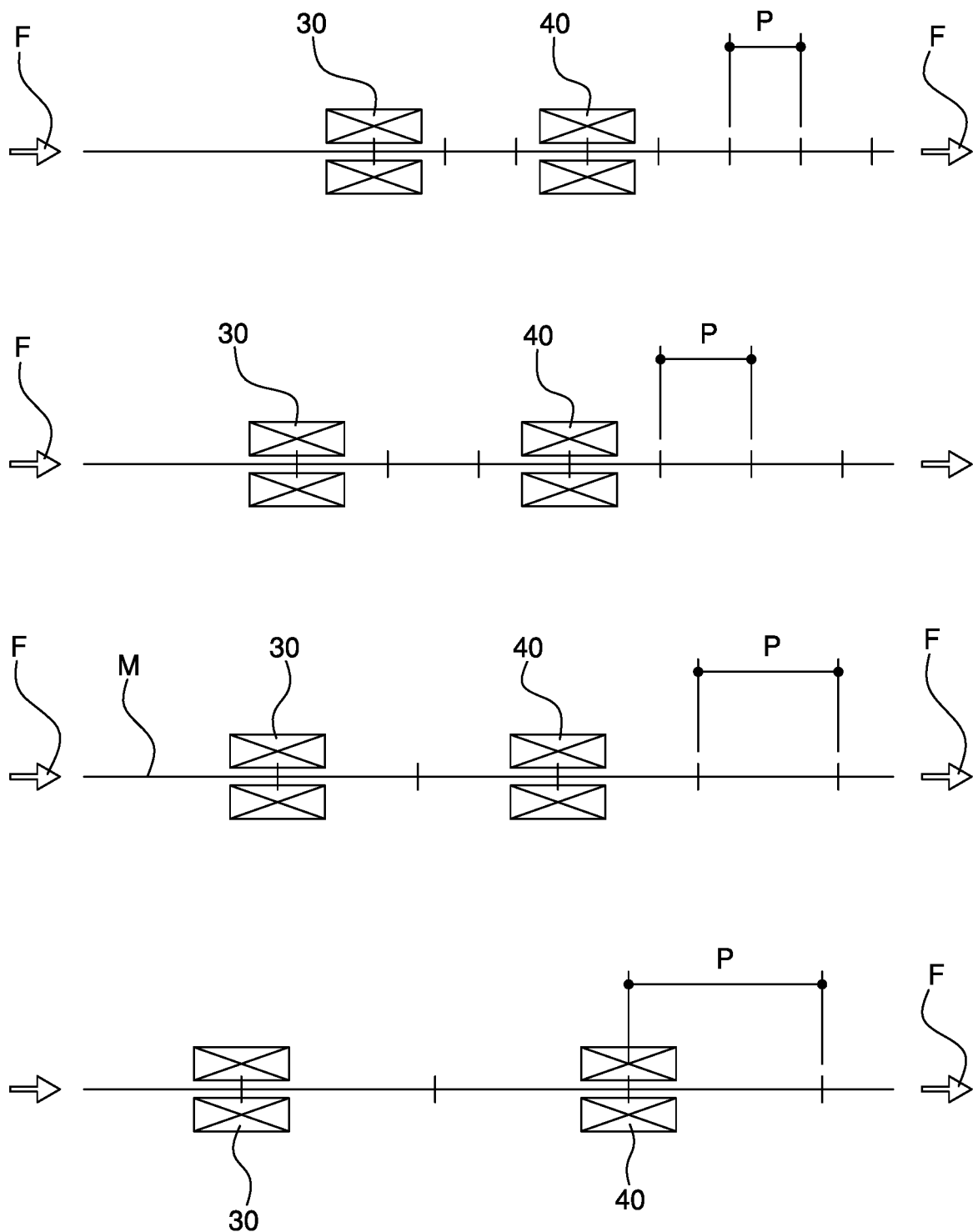
FIG. 3 schematically shows four different operating configurations of the tools of the two machining stations of the apparatus of FIG. 1 as the step of the intermittent feed of the material changes.

With reference to the aforementioned figures, for the sake of greater clarity of expression, similar elements have been indicated by the same numbering even if they belong to different embodiments.

With 1 overall a machining apparatus has been indicated, in particular for machining material/s M in the form of a web, strip, sheet, etc. The machining apparatus 1 may be used, in particular, to produce an electrical energy storage device, for example to machine material M comprising an electrode tape (cathode and/or anode) and/or at least one separator. The material M may comprise continuous material intended to be wound around a core rotating in a winding device 2 for forming an electrical energy storage device, or intended to be singled out and then stacked to form an electrical energy storage device.

The machining apparatus 1 may comprise, in particular, a feed path of the material M. The feed path may comprise, in particular, means (for example of known and not illustrated type) for dragging the material M along the feed path, means (for example of the roller type) for guiding the material M along the path, means (for example of known and not illustrated type) for tensioning the material M along the path, means (for example of known and not illustrated type) for performing checks and/or inspections of the material, etc.

The feed path may be configured, in particular, for feeding the material M with an intermittent feed that alternates periods of stopping and advancing of the material M. In particular, the intermittent feed of the material M is associated with the execution of a succession of machining cycles at at least two machining stations arranged in line along the path. In particular, as in the specific embodiments, during each stop two or more preset portions of the material M may be machined that stop in two or more machining stations, whereas during each advance (controlled step P) the suitable material M may be positioned to perform the machining tasks of the subsequent machining cycle at the same machining stations.

In these specific examples, the portions of material affected by the first machining may be substantially the same portions of material that will subsequently have to undergo the second machining. In other words, in order to enable the first machining and the second machining to be performed simultaneously—the first machining in a first machining station on a first portion of material (first portion that has to be subsequently positioned on the centre of the second machining station) and the second machining in a second machining station on a second portion of material (second portion that had already been previously positioned in the centre of the first machining station)—the distance between the two machining stations must be a multiple of the step P of intermittent feed of the material along the feed path.

The machining apparatus 1 may comprise, in particular, at least two machining stations 3 and 4 arranged one after the other the feed path. Each machining station 3 and 4 may be configured, as in these embodiments, for performing a succession of machining cycles in which each machining cycle comprises a stop phase of the material M and an advancing phase of the material M. In each stop phase of the material M, each machining station 3 and 4 may adopt an operating position (for example a closed position of pairs of tools 30 and 40 operating on the material) in which it performs a machining task on a portion of material M. In each phase of advancing the material M each machining station may adopt a non-operating position (for example an open position of the tools 30 and 40) in which it leaves the material free to advance by a step P to position the next portion of material in a suitable position for machining.

In these specific embodiments, one of the two machining stations is a welding station (for example a station for applying a web or sheet to the material by welding) whereas the other is a shearing station (for example a station for forming electrode tabs by shearing) arranged downstream of the welding station. It is possible to provide other machining stations, for example a station for applying protective material, in addition to or in replacement of the welding station and/or of the shearing station, arranged before and/or after and/or in between these machining stations. A machining station may be understood to be, in these embodiments, also an inspection and/or quality control station of the machining.

Each machining station 3 and 4 may comprise drive and feed means (for example of known and not illustrated type) that are usable for the operation of the tools 30 and 40.

At least one of the two machining stations may be movable on guide means 5 to vary its position along the feed path and enable the mutual distance between the two machining stations to be adjusted 3 and 4.

Also the other of the two machining stations may be, as in these embodiments, movable on guide means 5 (for example the same guide means 5 mentioned above) to vary its position along the feed path and enable the mutual distance between the two machining stations 3 and 4 to be adjusted.

The possibility of adjusting both the machining stations enables a product to be obtained at the exit from the machining apparatus that is already in the desired reference position to be received correctly in a continuous line from another machining system (for example the winding device 2) arranged downstream of the apparatus for the step machining of the material that continues to advance intermittently. In other words, the material machined at the exit of the second (or last) machining station may be already arranged in the suitable reference position (for example a zero position) for the next machining task.

The aforesaid guide means 5 may comprise, as in these embodiments, at least one linear sliding guide parallel to an advancement direction F of the material M along the feed path.

The machining apparatus 1 may comprise, in particular, programmable electronic control means (for example a non-illustrated electronic processor) that is suitable for adjusting the aforesaid mutual distance between the two machining stations 3 and 4 as a function of at least one datum relating to the step P of intermittent feed of the material M.

The control means may be so configured as to receive a datum relating to the step P of advancing and so as to move one or both the machining stations 3 and 4 so that the distance between the two machining stations 3 and 4 is suitable for performing the corresponding machining tasks simultaneously in both machining stations 3 and 4 during each stop phase of the material M. In particular, the distance between the two machining stations 3 and 4 measured along the feed path of the material M may be the same as a multiple of the step P.

The control means may be further configured so as to move both the machining stations 3 and 4 so that the material leaving the second (or last) machining station 4 is positioned with a corresponding desired reference position with respect to a subsequent machining task to be performed on the line, in particular in the winding device 2. In other words, the machining performed in the second (or last) machining station may be performed in a determined position along the feed path, i.e. a chosen position taking an external reference to the apparatus, i.e. the position indicated so that the material exiting the apparatus 1 can be received by another machining device arranged on the line downstream of the apparatus 1, without the need to adjust further the material that advances along the feed path.

The machining apparatus 1 may comprise, in particular, at least one unwinding roll 6 of the material M.

The roll 6 may be movable coupled on linear roll-guide means 7 parallel to an advancement direction F of the material M along the feed path so as to vary the position thereof and enable the distance thereof to be adjusted by the two machining stations 3 and 4. The roll-guide means 7 may comprise, as in these embodiments, at least one linear sliding guide parallel to an advancement direction F of the material M along the feed path.

Each machining station 3 and 4 may comprise, as in these embodiments, motor means 8 for driving the movement on the guide means 5 of the corresponding machining station 3 or 4. The motor means 8 may be fitted to the corresponding machining station 3 and 4 (as in this case) or can be outside the machining station. The movement system of the machining stations 3 and 4 on the guide means 5 may comprise, for example, a rack conveying system, or a conveying system with a flexible conveying member (for example a belt, cable, chain, etc conveying system), or a movement system with a fluid actuator (for example a linear actuator, in particular a hydraulic or pneumatic cylinder), or a translator system (for example with screw and nut screw), or another movement system.

Figure 4:
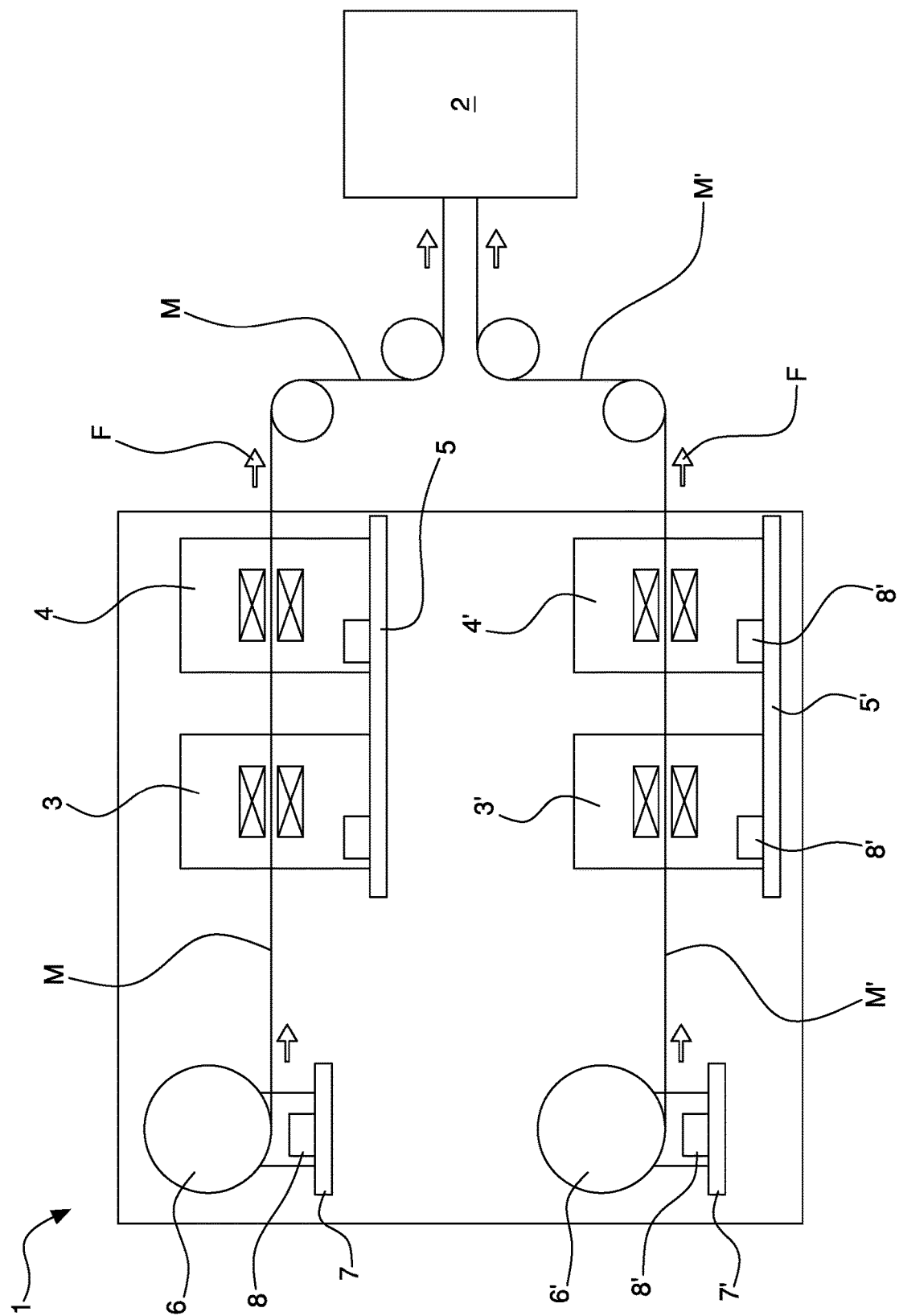
FIG. 4 is a diagram, in a vertical elevation, of a second embodiment of a machining apparatus made according to the present invention.

The machining apparatus 1 may comprise, in particular as in the example in FIG. 4, a further feed path for feeding further material M' with an intermittent feed. In this embodiment, the machining apparatus 1 may comprise, in particular, at least two further machining stations 3' and 4' (for example similar to the machining stations 3 and 4) arranged one after the other along said further feed path. The material M may comprise, for example, an electrode of one sign (cathode or anode) and the material M' may comprise, for example, an electrode of the opposite sign (anode or cathode).

Each of the aforesaid further machining stations 3' and 4' may be configured, in particular, for performing machining cycles, each of which comprises at least one stop phase and at least one phase of further advancing material M'. Each further machining station 3' and 4' may be movable on further guide means 5' (upon the command of further motor means 8') to vary its position along the further feed path and enable the reciprocal distance to be varied between the two further machining stations 3' and 4'. Each further machining station 3' and 4' may comprise, in particular, a further roll 6' movable on further roll-guide means 7' upon the command of further motor means 8'.

The feed path and the further feed path may converge, as in the example in FIG. 4, to the same machining zone of the material M and of the further material M'. This machining zone may comprise, in particular, the winding device 2 configured for winding together the material M coming from the feed path and the further material M' coming from the further feed path (and other possible materials).

One method for manufacturing electrical energy storage devices, which is actuatable by using the machining apparatus disclosed here, may comprise the phase of intermittent feeding of the material along a feed path, alternating stop and advancing phases.

This method may comprise the phase of arranging at least two machining stations in line and one after the other along the feed path.

This method may comprise the phase of varying the position of at least one of, or both, the two aforesaid machining stations along the feeding path to adjust the mutual distance between the two machining stations according to at least one datum related to the step P of intermittent feed of material M.

In operation, the material M advances intermittently with step P. The machining stations 3 and 4 are positioned so that the length of the feeding path in the portion included between the stations themselves is a multiple of the step P. During the stop phase of the material M, the tools 30 and 40 of the two machining stations 3 and 4 may operate simultaneously on the material M so that the portion of material processed in the second machining station is the one already processed during a previous stop phase in the first machining station. In this way it is possible to perform two simultaneous machining operations on the material M in stop phase.

When the machining step and therefore the feed step P of the material must be changed, for example due to a change in the size of the product to be manufactured, the position of at least one of the two machining stations can be adjusted (in the direction of the length of the feed path), so that the relative position of the machining stations also allows in this case to simultaneously work the material in the two machining stations and in the same stop phases.

This adjustment may take place automatically, under control of the programmable electronic control means and computer program instructions that may be implemented on the control means.

FIG. 3 shows four examples of possible positioning of tools 30 and 40 of machining stations 3 and 4 which allow simultaneous machining at four different processing steps P of the material.

In the examples described herein, each material supply line comprises two machining stations, although within the scope of the same invention it is possible to provide for the use of three or more machining stations arranged in line.

Each machining station, in addition to adjusting its position as a function of the machining step P, may be provided with further adjustment means (for example, computer program instructions) for carrying out further adjustment according to the signal of sensor means (for example a vision system) which detect the real position of the machining performed on the material M from the previous machining station, so as to compensate for machining errors and reduce the variability of the machining with respect to the tolerances of the material M.

FIG. 5 shows a third example in which the apparatus comprises at least two machining stations 3 and 4 (in this example three stations), arranged superiorly, which are suspended on guides 7 (linear sliding) fixed superiorly, and at least two machining stations 3' and 4' (in this example three stations), arranged inferiorly, which rest on guides 7' (linear sliding) fixed inferiorly. The same configuration may also be provided for the reel 6 (upper coil suspended on upper guides 7) and the reel 6' (lower reel resting on lower guides 7'). In this configuration, there is a large free space between the upper machining stations 3, 4 and the lower machining stations 3', 4'.

The invention claimed is:

1. Apparatus (1) for manufacturing electrical energy storage devices, comprising at least one feed path for feeding material (M) with intermittent feed that alternates stops and advances of the material (M), and at least two machining stations (3; 4) arranged one after the other along said feed path, each of said at least two machining stations (3; 4) being configured to perform a succession of machining cycles in which each machining cycle comprises a phase of stopping the material (M) and a phase of advancing the material (M), at least one of said at least two machining stations (3; 4) being movable on guide means (5) to vary its position along said feed path and allow an adjustment of the mutual distance between said at least two machining stations (3; 4).

2. Apparatus according to claim 1, comprising programmable electronic control means adapted to adjust said mutual distance between said at least two machining stations (3; 4) as a function of at least one data relating to a step (P) of the intermittent advancing of the material (M).

3. Apparatus according to claim 1, wherein the other of said at least two machining stations (3; 4) is movable on guide means (5) to vary its position along said feed path and allow an adjustment of a mutual distance between said at least two machining stations (3; 4).

4. Apparatus according to claim 1, wherein said guide means (5), on which said at least one of said at least two machining stations (3; 4) is movable, comprises at least one linear sliding guide that is parallel to a feed direction (F) of the material (M).

5. Apparatus according to claim 1, comprising at least one unwinding roll (6) of the material (M) that is movable along linear roll-guide means (7) that is parallel to a feed direction (F) of the material (M) so as to vary its position and allow an adjustment of its distance from said at least two machining stations (3; 4).

6. Apparatus according to claim 1, wherein one (3) of said at least two machining stations is a welding station and the other (4) of said at least two machining stations is a shearing station arranged downstream of said welding station.

7. Apparatus according to claim 1, comprising motor means (8) for actuating the movement of said at least one of said at least two machining stations (3; 4) on said guide means (5).

8. Apparatus according to claim 1, comprising a further feed path for feeding further material (M') with intermittent feed, and at least two further machining stations (3'; 4') arranged one after the other along said further feed path, each of said at least two further machining stations (3'; 4') being configured to carry out machining cycles each of which comprises at least one stop phase and at least one advancing phase of the further material (M'), at least one of said at least two further machining stations (3'; 4') being movable on further guide means (5') to vary its position along said further feed path and allow to adjust the mutual distance between said at least two further machining stations (3'; 4'), said feed path and said further feed path converging towards the same machining area of the material (M) and the further material (M').

9. Apparatus according to claim 8, wherein said machining stations (3; 4) are arranged above said further machining stations (3'; 4') and wherein said machining stations (3; 4) are slidably suspended on said guide means (5) and said further machining stations (3'; 4') are slidably supported on said further guide means (5').

10. Apparatus according to claim 8, wherein said machining area comprises a winding device (2) configured to wind together the material (M) coming from said feed path and the further material (M') coming from said further feed path; and/or wherein said machining area comprises a device for singularizing the material (M) and the further material (M') and for stacking the singularized pieces.

11. Method for manufacturing electrical energy storage devices, comprising intermittently feeding the material (M) along at least one feed path, arranging at least two machining stations (3; 4) one after the other along said feed path, and varying the position of at least one of said at least two machining stations (3; 4) along said feed path to adjust the mutual distance between said at least two machining stations (3; 4) as a function of at least one data relating to a step (P) of intermittent feed of the material (M).

\* \* \* \* \*